(12) United States Patent
Zhang et al.

(10) Patent No.: US 11,037,392 B2
(45) Date of Patent: Jun. 15, 2021

(54) VENDING MACHINE AND ITEM DISPENSING METHOD

(71) Applicant: Shandong New Beiyang Information Technology Co., Ltd., Shandong (CN)

(72) Inventors: Chunguang Zhang, Shandong (CN); Cunqiang Sun, Shandong (CN); Botao Wang, Shandong (CN); Jianyu Sun, Shandong (CN)

(73) Assignee: Shandong New Beiyang Information Technology Co., Ltd., Shandong (CN)

( * ) Notice: Subject to any disclaimer, the term of this patent is extended or adjusted under 35 U.S.C. 154(b) by 0 days.

(21) Appl. No.: 16/958,420

(22) PCT Filed: Sep. 5, 2018

(86) PCT No.: PCT/CN2018/104132
§ 371 (c)(1),
(2) Date: Jun. 26, 2020

(87) PCT Pub. No.: WO2019/128297
PCT Pub. Date: Jul. 4, 2019

(65) Prior Publication Data
US 2021/0065494 A1    Mar. 4, 2021

(30) Foreign Application Priority Data
Dec. 29, 2017 (CN) .......................... 201711497940.6

(51) Int. Cl.
*G07F 11/16* (2006.01)
*G05B 19/416* (2006.01)
*G07F 11/58* (2006.01)

(52) U.S. Cl.
CPC ............ *G07F 11/16* (2013.01); *G05B 19/416* (2013.01); *G07F 11/58* (2013.01); *G05B 2219/40554* (2013.01)

(58) Field of Classification Search
CPC ....................................................... G07F 11/16
See application file for complete search history.

(56) References Cited

U.S. PATENT DOCUMENTS

| 6,513,677 B1* | 2/2003 | Sorensen | G07F 11/16 221/130 |
| 2006/0011646 A1* | 1/2006 | Chirnomas | G07F 11/165 221/210 |
| 2006/0261080 A1* | 11/2006 | Matsumoto | G07F 11/58 221/124 |

FOREIGN PATENT DOCUMENTS

| CN | 202205275 U | 4/2012 |
| CN | 103295322 A | 9/2013 |

(Continued)

OTHER PUBLICATIONS

International Search Report dated Dec. 5, 2018, in the International Application No. PCT/CN2018/104132. 4 pages.

*Primary Examiner* — Gene O Crawford
*Assistant Examiner* — Ayodeji T Ojofeitimi
(74) *Attorney, Agent, or Firm* — Wilmer Cutler Pickering Hale and Dorr LLP

(57) ABSTRACT

A vending machine and an item dispensing method. The vending machine includes: a storage column used to store items; a bucket used to receive an item from the storage column; a first conveying mechanism disposed at the storage column and used to convey the item in the storage column to the bucket; a second conveying mechanism disposed at the bucket and used to convey the item from the storage column to the inside of the bucket; and a controller. The first and second conveying mechanisms are each electrically connected to the controller. The item dispensing method includes controlling the first conveying mechanism to convey an item to the bucket at a first preset speed and controlling the second conveying mechanism to convey the (Continued)

item to the inside of the bucket at a second preset speed, as the item is entering the bucket, the first preset speed being less than the second preset speed.

19 Claims, 5 Drawing Sheets

(56) References Cited

FOREIGN PATENT DOCUMENTS

| | | | |
|---|---|---|---|
| CN | 104003113 | A | 8/2014 |
| CN | 104821043 | A | 8/2015 |
| CN | 105279850 | A | 1/2016 |
| CN | 106005957 | A | 10/2016 |
| CN | 106155821 | A | 11/2016 |
| CN | 206179102 | U | 5/2017 |
| CN | 107424309 | A | 12/2017 |
| JP | 2003-085637 | A | 3/2003 |
| JP | 2006-235684 | A | 9/2006 |
| JP | 2017-076344 | A | 4/2017 |
| JP | 2017-151542 | A | 8/2017 |

* cited by examiner

US 11,037,392 B2

VENDING MACHINE AND ITEM DISPENSING METHOD

CROSS-REFERENCE TO RELATED APPLICATIONS

This application is a United States national stage application of co-pending International Patent Application Number PCT/CN2018/104132, filed on Sep. 5, 2018, which claims priority to Chinese patent application No. 201711497940.6, filed on Dec. 29, 2017, with the China National Intellectual Property Administration, the disclosures of which are incorporated herein by reference in their entireties.

TECHNICAL FIELD

The present application relates the field of self-service vending equipment, for example, to a vending machine and an item dispensing method.

BACKGROUND

As automated equipment, a vending machine can automatically vend goods. Vending machines are becoming increasingly popular because they are not restricted by time and place, and they can save manpower, and facilitate transactions.

The related art discloses a vending machine that includes a storage column for storing items and a bucket moving between the storage column and an outlet. When the bucket moves to a position facing the storage column, a conveying mechanism in the storage column conveys an item in the storage column to the bucket, and then the bucket conveys the item to the outlet so that the user can take the item away.

As the item is being conveyed from the storage column to the bucket, however, if two items are closely attached to each other or too close to each other, then the problem may arise that the two items may be conveyed to the bucket at a single time. In cases where the user purchases only one item, it would cause losses to the goods supplier.

SUMMARY

One embodiment of the present application provides a vending machine, which is capable of controlling the amount of items the bucket extracts from the storage column thereby avoiding the dispensing of two items at a single time.

Another embodiment of the present application provides an item dispensing method, which is capable of controlling the amount of items the bucket extracts from the storage column thereby avoiding the dispensing of two items at a single time.

The vending machine includes a storage column, a bucket, a first conveying mechanism, a second conveying mechanism, and a controller. The storage column is configured to store items. The bucket is configured to receive an item from the storage column. The first conveying mechanism is disposed at the storage column and is configured to convey an item in the storage column to the bucket. The second conveying mechanism is disposed at the bucket and is configured to convey the item received from the storage column by the bucket to the inside of the bucket. The first conveying mechanism and the second conveying mechanism are each electrically connected to the controller. The controller is configured to, as the item is entering the bucket, control the first conveying mechanism to convey the item to the bucket at a first preset speed and control the second conveying mechanism to convey the item to the inside of the bucket at a second preset speed, where the first preset speed is less than the second preset speed.

In one embodiment, the vending machine further includes a first detection device disposed at the bucket. The first detection device is electrically connected to the controller and is configured to output an item-beginning-to-enter signal as the item is beginning to enter the bucket. The controller is configured to control the first conveying mechanism to convey the item to the bucket at the first preset speed and control the second conveying mechanism to convey the item to the inside of the bucket at the second preset speed, according to the item-beginning-to-enter signal.

In one embodiment, the first preset speed has a value of zero.

In one embodiment, the first detection device is further configured to output an item-entrance-finished signal in response to the item having entered the bucket. The controller is further configured to control the second conveying mechanism to stop conveying the item according to the item-entrance-finished signal.

In one embodiment, the vending machine further includes a second detection device, which is disposed at an outlet of the storage column or at an inlet of the bucket. The second detection device is electrically connected to the controller and is configured to output a gap-detected signal in response to a gap between an item located in the storage column and the item located in the bucket being detected. The controller is further configured to control the first conveying mechanism to stop conveying the item located in the storage column according to the gap-detected signal.

There is further provided a method for dispensing an item that is applied to a vending machine. The vending machine includes a storage column and a bucket. The storage column is configured to store items. The bucket is configured to receive an item from the storage column. A first conveying mechanism is disposed at the storage column and is configured to convey the item in the storage column to the bucket. A second conveying mechanism is disposed at the bucket and is configured to convey the item received from the storage column by the bucket to the inside of the bucket. The method includes the following operations: as the item is entering the bucket, controlling the first conveying mechanism to convey the item to the bucket at a first preset speed and controlling the second conveying mechanism to convey the item to the inside of the bucket at a second preset speed, where the first preset speed is less than a second preset speed.

In one embodiment, the operation of "as the item is entering the bucket, controlling the first conveying mechanism to convey the item to the bucket at a first preset speed and controlling the second conveying mechanism to convey the item to the inside of the bucket at a second preset speed" includes: detecting whether the item is beginning to enter the bucket; in response to detecting that the item is beginning to enter the bucket, controlling the first conveying mechanism to convey the item to the bucket at the first preset speed and controlling the second conveying mechanism to convey the item to the inside of the bucket.

In one embodiment, the first preset speed has a value of zero.

In one embodiment, a detection is performed as to whether the item has entered the bucket; and in response to detecting that the item has entered the bucket, the second conveying mechanism is controlled to stop conveying the item.

In one embodiment, the method further includes the following operations: detecting whether there is a gap between an item located in the storage column and the item located in the bucket; and in response to a gap between the item located in the storage column and the item located in the bucket being detected, controlling the first conveying mechanism to stop conveying the item located in the storage column.

In the vending machine provided by embodiments of the present application, a first conveying mechanism is disposed at a storage column and a second conveying mechanism is disposed at a bucket; as an item is entering the bucket, the first conveying mechanism is controlled to convey the item to the bucket at a first preset speed and the second conveying mechanism is controlled to convey the item to the inside of the bucket at a second preset speed greater than the first preset speed. Thus, as an item is being conveyed from the storage column to the bucket, after the previous item is beginning to enter the bucket, the distance between the previous item and the next item is increased because the previous item is moving to the inside of the bucket at the second preset speed while the next item is moving at the first preset speed smaller than the second preset speed. This solves the problem that two items are conveyed into the bucket at a single time because these two items are closely attached to each other or because the distance between the two items is too small, thereby preventing loss of the goods supplier.

The item dispensing method provided by embodiments of the present application is applied to a vending machine. In the item dispensing method, as an item is entering the bucket, the first conveying mechanism is controlled to convey the item to the bucket at a first preset speed and the second conveying mechanism is controlled to convey the item received from the storage column by the bucket to the inside of the bucket at a second preset speed, where the first preset speed is less than the second preset speed. Thus, as the item is being conveyed from the storage column to the bucket, after the previous item is beginning to enter the bucket, the distance between the previous item and the next item is increased because the previous item is moving to the inside of the bucket at the second preset speed and the next item is moving at the first preset speed less than the second preset speed, thereby solving the problem that two items are conveyed into the bucket at a single time because these two items are closely attached to each other or because the distance between the two items is too small. This avoids the less of the goods supplier.

REFERENCE SIGNS

Figure 1:
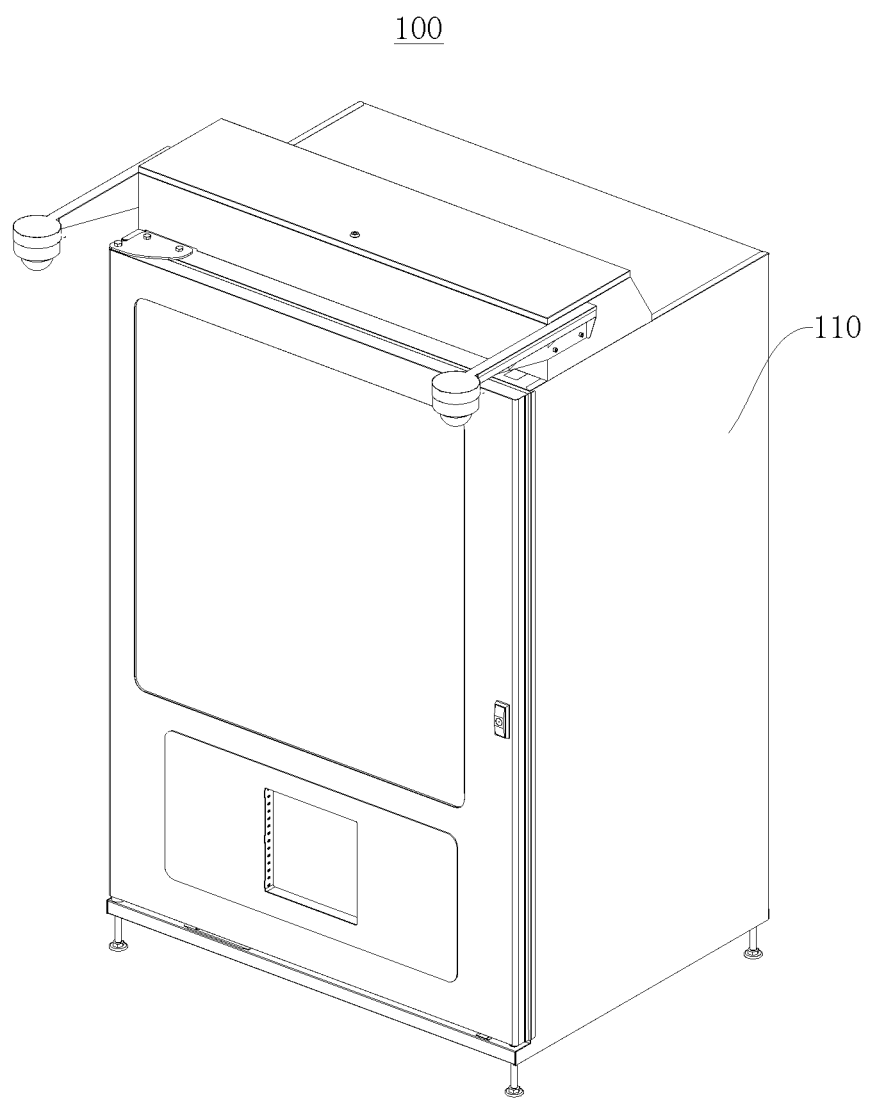
FIG. 1 is a schematic view illustrating the external structure of a vending machine according to a first embodiment of the present application.

| | |
|---|---|
| 100. Vending machine | 110. Cabinet |
| 210. Storage column | 220. Bucket |
| 211. First conveying mechanism | 221. Second conveying mechanism |
| 230. Controller | 241. First detection device |
| 242. Second detection device | |

DETAILED DESCRIPTION

Similar reference numerals and letters in the following drawings indicate similar items, and therefore, once a particular item is defined in a drawing, the item is not defined and explained in subsequent drawings. In the description of embodiments of the present application, it is to be noted that the terms "first", "second", etc. are used only for distinguishing between descriptions and are not to be construed as indicating or implying relative importance.

First Embodiment

FIG. 1 is a schematic view illustrating the external structure of a vending machine 100 according to a first embodiment of the present application. Referring to FIG. 1, the present embodiment provides a vending machine 100 including a cabinet 110.

Figure 2:
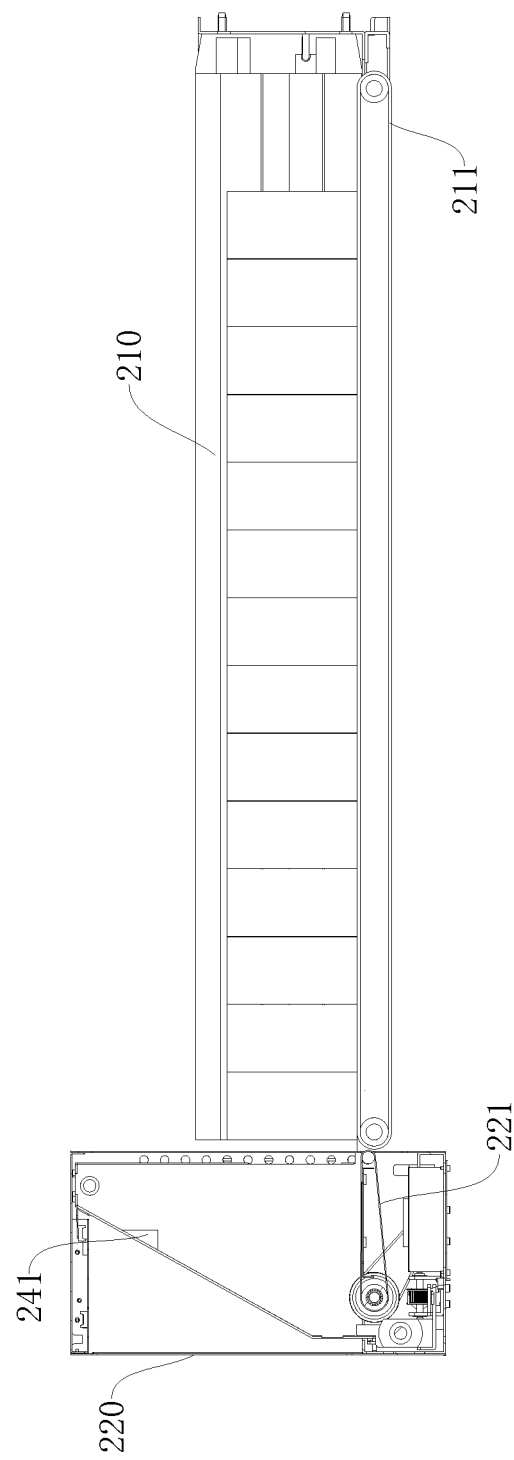
FIG. 2 is a schematic view of a storage column and a bucket of the vending machine according to the first embodiment of the present application.

FIG. 2 is a schematic view of a storage column 210 and a bucket 220 of a vending machine 100 according to one embodiment of the present application. Referring to FIG. 2, the inside of the cabinet 110 is provided with a storage column 210, a bucket 220, a first conveying mechanism 211 and a second conveying mechanism 221. The storage column 210 is configured to store items. The bucket 220 is configured to butt with the storage column 210 and receive the item from the storage column 210. The first conveying mechanism 211 is disposed at the storage column 210 and is configured to convey the item in the storage column 210 to the bucket 220. The second conveying mechanism 221 is disposed at the bucket 220 and is configured to convey the item received from the storage column 210 by the bucket 220 to the inside of the bucket 220. The item conveying procedure of the vending machine may be: conveying the item in the storage column 210 to the bucket 220 by the first conveying mechanism 211, receiving and conveying the item to the inside of the bucket 220 by the second conveying mechanism 221, and conveying the item to an outlet of the vending machine 100 by the bucket 220.

Figure 3:
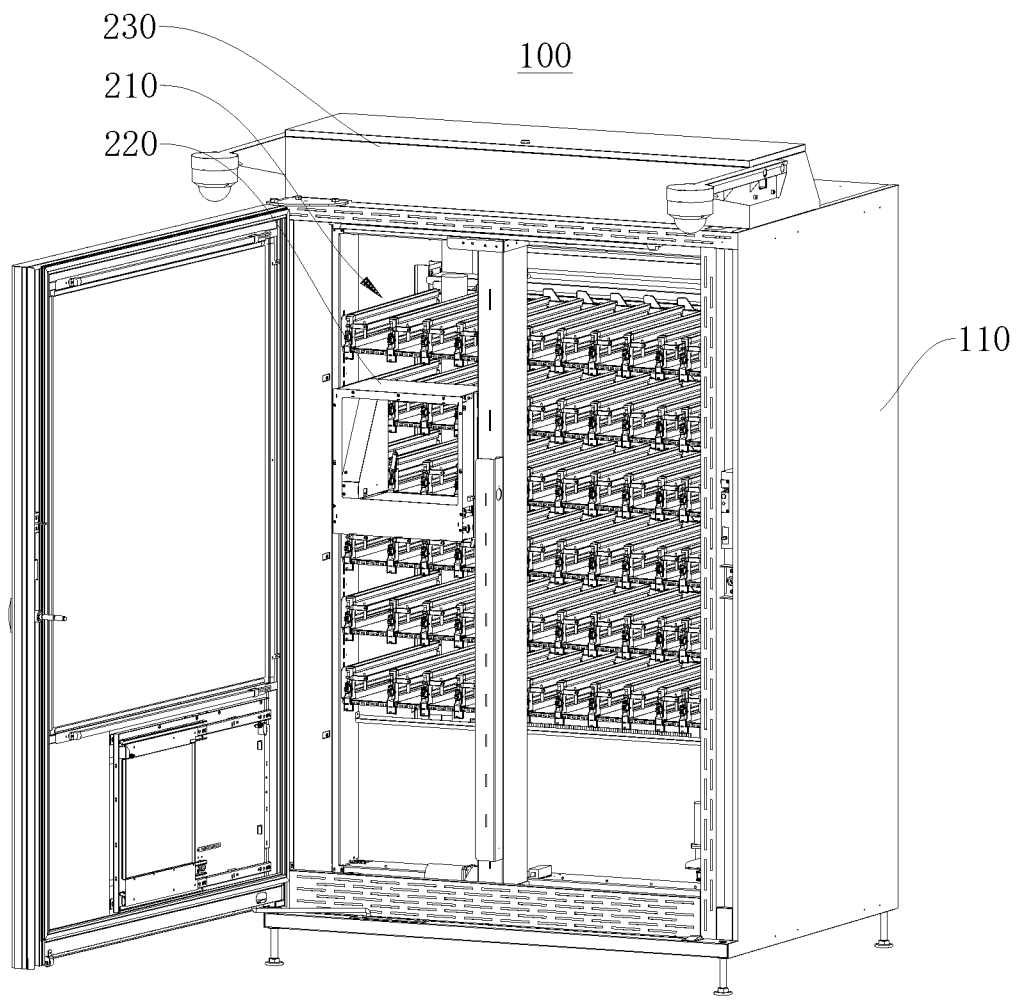
FIG. 3 is a schematic view illustrating the internal structure of the vending machine according to the first embodiment of the present application.

FIG. 3 is a structure view show an inner structure of a vending machine according to one embodiment of the present application. Referring to FIG. 3, the vending machine 100 further includes a controller 230. The first conveying mechanism 211 and the second conveying mechanism 221 are both electrically connected to the controller 230. In the case where the item moves from the storage column 210 to the bucket 220, the controller 230 may control the first conveying mechanism 211 to convey the item in the storage column 210 to the bucket 220 at a first preset speed and control the second conveying mechanism 221 to convey the item received from the storage column 210 by the bucket 220 to the inside of the bucket 220 at a second preset speed. Under the control of the controller 230, the first preset speed of the first conveying mechanism 211 is less than the second preset speed of the second conveying mechanism 221, that is, when the item in the storage column 210 reaches the inlet of the bucket 220, the second conveying mechanism 221 conveys the item having been located at the inlet of the bucket 220 to the inside of the bucket 220 at a speed greater than the speed of the first conveying mechanism 211 and the item having not reached the bucket 220 and still being in the storage column 210 moves in the storage column 210 at the first preset speed less than the speed of the second conveying mechanism 221 or stops moving in the storage column 210. In this manner, during the process of the item being conveyed from the storage column 210 to the bucket 220, after the previous one of the item enters the bucket 220, because the previous one of the item entering the inlet of the bucket 220 moves to the inside of the bucket 220 at the second preset speed, the distance between the previous item and the next item increases. Therefore, the problem in which two items are conveyed into the bucket 220 at a single time because the two items are closely attached to each other or too close to each other is avoided.

In an optional example, as shown in FIG. 2, the vending machine 100 further includes a first detection device 241 disposed in the inside of the bucket 220 and electrically connected to the controller 230. When the item is beginning to enter the bucket 220 from the storage column 210, the first detection device 241 outputs an item-beginning-to-enter signal, and according to the item-beginning-to-enter signal, the controller 230 controls the first conveying mechanism 211 to convey the item in the storage column 210 to the bucket 220 at the first preset speed and controls the second conveying mechanism 221 in the bucket 220 to convey the item received from the storage column 210 by the bucket 220 to the inside of the bucket 220 at the second preset speed. Because the first preset speed is less than the second preset speed, the moving speed of the item located in the bucket 220 is greater than the moving speed of the item located in the storage column 210 and the distance between the items in the storage column 210 and the item in the bucket 220 gradually increases. In this manner, during the process of the item in the bucket 220 being conveyed to the inside of the bucket 220, other items in the storage column 210 are prevented from entering the bucket 220 again so that the bucket 220 can convey only one item at a single time rather than two or more items.

In another optional example, the first preset speed has a value of zero. In one or more embodiments, in the case where the item in the storage column 210 is conveyed to the bucket 220 by the first conveying mechanism 211, when the first detection device 241 in the bucket 220 outputs the signal indicating that the item is beginning to enter the bucket 220, the first conveying mechanism 211 controlled by the controller 230 stops conveying the item in the storage column 210. At this point, the second conveying mechanism 221 disposed at the bucket 220 conveys the item received from the storage column 210 by the bucket 220 to the inside of the bucket 220 at the second preset speed so that the distance between the item entering the bucket 220 and item left in the storage column 210 is increased. Meanwhile, because the second preset speed is greater than the first preset speed, the item entering the bucket 220 topples backward by inertia and stops the other item left in the storage column 210 from entering the bucket 220 so that there is only one item in the bucket 220, that is, the bucket 220 can convey only one item at a single time.

In the present embodiment, when the item has entered the bucket 220, the first detection device 241 may output an item-entrance-finished signal. According to the item-entrance-finished signal, the controller 230 may control the second conveying mechanism 221 to stop conveying the item. Exemplarily, the second conveying mechanism 221 in the bucket 220 conveys the item received from the storage column 210 to the inside of the bucket 220. When the item has entered the bucket 220, the first detection device 241 outputs the item-entrance-finished signal. According to the item-entrance-finished signal, the controller 230 controls the second conveying mechanism 221 to stop conveying the item.

Figure 4:
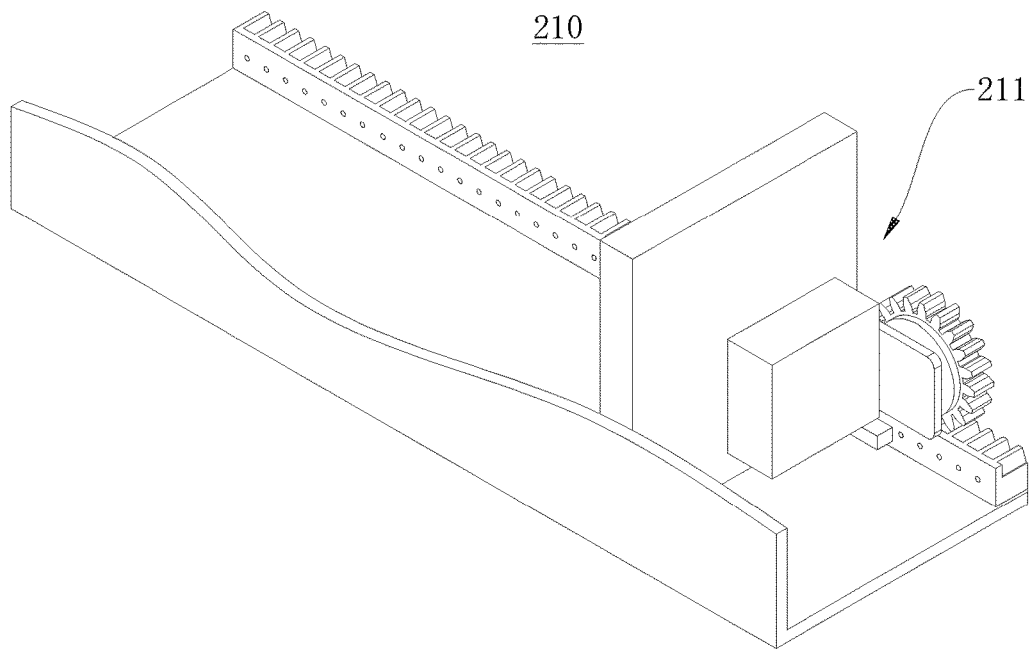
FIG. 4 is a schematic view of a first conveying mechanism of the vending machine according to the first embodiment of the present application.

In an optional example, referring to FIG. 2, in the present embodiment, the first conveying mechanism 211 and the second conveying mechanism 221 are both belt mechanisms. The item in the storage column 210 and the item in the bucket 220 are both conveyed by the belt mechanisms. FIG. 4 is a structure view of another first conveying mechanism 211 of a vending machine 100 according to one embodiment of the present application. Exemplarily, referring to FIG. 4, the first conveying mechanism 211 may also include a driving assembly and a pushing plate driven by the driving assembly. In the case where the driving assembly drives the pushing plate to move, the pushing plate can push the item in the storage column 210 to move toward the bucket 220. The driving assembly may include a motor, a rack and a gear. The rack may extend along the lengthwise direction of the storage column 210. The motor may be fixed on the pushing plate, the motor may be connected to the gear in a driving manner, and the gear engages with the rack.

The first detection device 241 may be a photoelectric sensor. In other examples, the first detection device 241 may also be a pressure sensor or a distance sensor. The controller 230 may be a micro program controller. In other examples, the controller 230 may also be a combinatorial logic controller.

According to one embodiment of the present application, the vending machine 100 can detect that the item enter the bucket 220 from the storage column 210. Moreover, when it is detected that the item enters the inlet of the bucket 220, the vending machine 100 controls the first conveying mechanism 211 in the storage column 210 to stop working and controls the second conveying mechanism 221 in the bucket 220 to convey the item at the inlet of the bucket 220 and received from the storage column 210 to the inside of the bucket 220 at the second preset speed. Because the first conveying mechanism 211 stops working in the case where the item enter the bucket 220, the distance between the previous item entering the bucket 220 and the next item left in the storage column 210 increases so that there is only one item in the bucket 220 and the case where the bucket 220 dispensing two items at a single time is avoided. When the item has entered the bucket 220, the first detection device 241 may output an item-entrance-finished signal. According to the item-entrance-finished signal, the controller 230 may control the second conveying mechanism 221 to stop conveying the item.

The present embodiment further provides an item dispensing method, which is applied in the vending machine 100. The method includes the step described below.

In the case where the item enter the bucket 220 from the storage column 210, the first conveying mechanism 211 in the storage column 210 is controlled to convey the item in the storage column 210 to the bucket 220 at a first preset speed and the second conveying mechanism 221 in the bucket 220 is controlled to convey the item received from the storage column 210 by the bucket 220 to the inside of the bucket 220 at a second preset speed, where the first preset speed is less than the second preset speed, that is, the second conveying mechanism 221 conveys the item having been located at the inlet of the bucket 220 to the inside of the bucket 220 at a speed greater than the speed of the first conveying mechanism 211 and the item having not entered the bucket 220 and still being in the storage column 210 moves in the storage column 210 at a speed less than the speed of the second conveying mechanism 221 or stops. As such, two items adjacent to each other in the storage column 210 are separated so that the bucket 220 is prevented from dispensing two items at a single time.

In an optional example, the item dispensing method further includes: detecting whether the items is beginning to enter the bucket 220; when the item is beginning to enter the bucket 220, controlling the first conveying mechanism 211 to convey the item in the storage column 210 to the bucket 220 at the first preset speed and controlling the second conveying mechanism 221 to convey the item received from the storage column 210 by the bucket 220 to the inside of the bucket 220 at the second preset speed. Exemplarily, the first detection device 241 disposed at the bucket 220 detects whether the item is beginning to enter the bucket 220. When the item is beginning to enter the bucket 220, the first detection device 241 output an item-beginning-to-enter signal. According to the item-beginning-to-enter signal, the controller 230 controls the first conveying mechanism 211 to convey the item in the storage column 210 to the bucket 220 at the first preset speed and controls the second conveying mechanism 221 to convey the item received from the storage column 210 by the bucket 220 to the inside of the bucket 220 at the second preset speed.

In another optional example, the first preset speed has a value of zero. In the case where the item in the storage column 210 is conveyed to the bucket 220 by the first conveying mechanism 211, when the first detection device 241 in the bucket 220 outputs an item-beginning-to-enter signal, according to the item-beginning-to-enter signal, the controller 230 controls the first conveying mechanism 211 to stop conveying the item in the storage column 210. In this case, the second conveying mechanism 221 disposed at the bucket 220 convey the item from the storage column 210 and entering the bucket 220 to the inside of the bucket 220 at the second preset speed so that the distance between the previous item entering the bucket 220 and the next item left in the storage column 210 increases. Meanwhile, because the second preset speed is greater than the first preset speed, the previous item entering the bucket 220 topples backward by inertia and stops the next item left in the storage column 210 from entering the bucket 220 so that there is only one item in the bucket 220, that is, the bucket 220 can dispense only one item at a single time.

According to the present embodiment, the item dispensing method further includes: detecting whether the item has entered the bucket 220; when it is detected that the item has entered the bucket 220, controlling the second conveying mechanism 221 to stop conveying the item. Exemplarily, when the item has entered the bucket 220, the first detection device 241 outputs an item-entrance-finished signal. According to the item-entrance-finished signal, the controller 230 controls the second conveying mechanism 221 to stop conveying the item. After the second conveying mechanism 221 stops conveying the item, the bucket 220 may move to the outlet of the vending machine 100 for the user to take the item away from the outlet.

In the item dispensing method provided by one embodiment of the present application, after the item is controlled to enter the bucket 220, the first preset speed of the first conveying mechanism 211 in the storage column 210 is less than the second preset speed of the second conveying mechanism 221 in the bucket 220. In this manner, one item in the bucket 220 is separated from the other items in the storage column 210 so that the bucket 220 can dispense only one item at a single time.

Second Embodiment

The present embodiment further provides a vending machine 100, which is basically the same as the vending machine described in the preceding embodiment. Compared with the first detection device 241 of the vending machine 100 in the first embodiment, a second detection device 242 of the vending machine 10 in the second embodiment is disposed in a more flexible manner. Moreover, the detection mechanism of the second detection device 242 is different from the detection mechanism of the first detection device 241.

Figure 5:
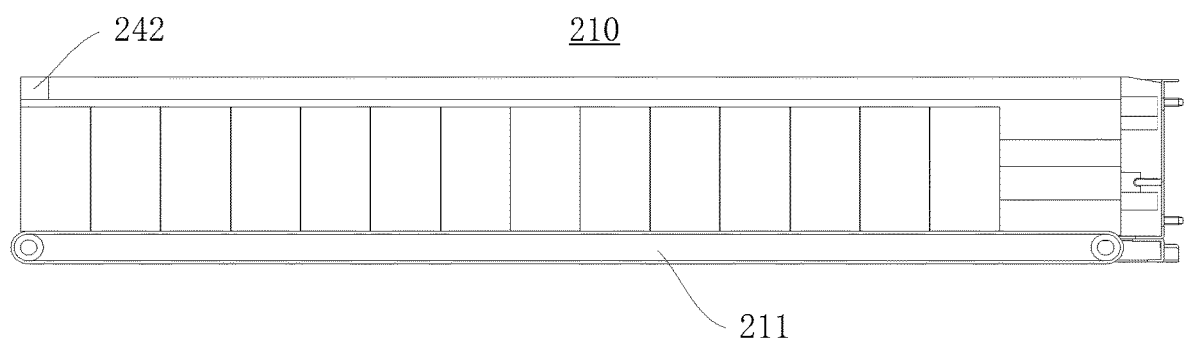
FIG. 5 is a schematic view of a storage column of a vending machine according to a second embodiment of the present application.
Figure 6:
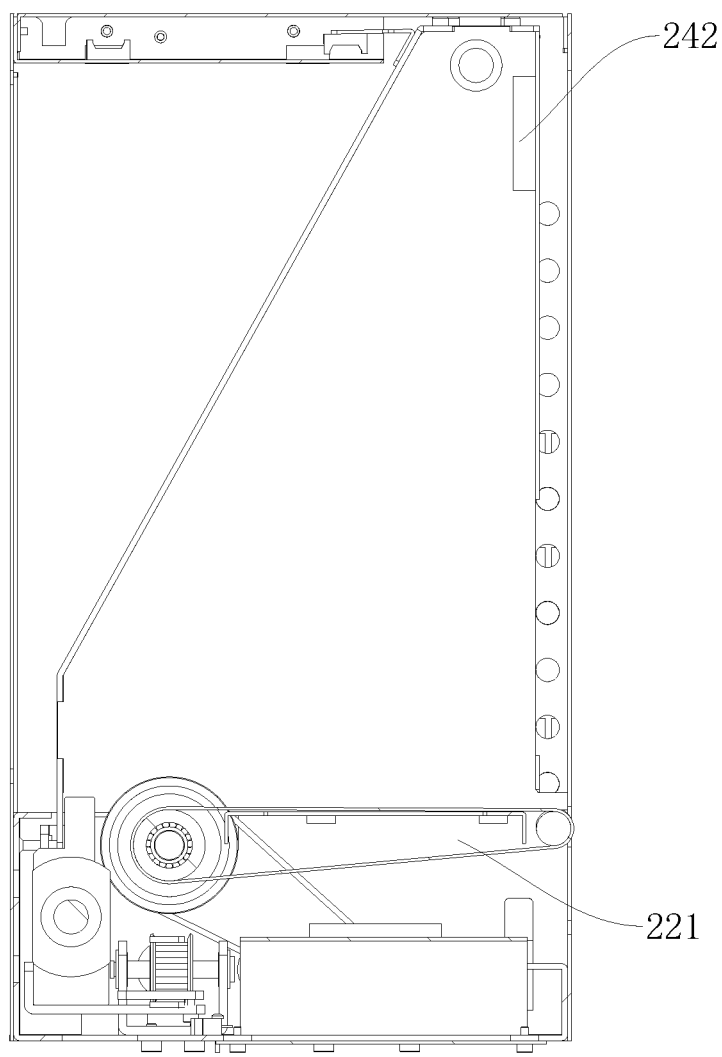
FIG. 6 is a schematic view of a bucket of the vending machine according to the second embodiment of the present application.

FIG. 5 is a schematic view of a storage column 210 of a vending machine 100 according to the second embodiment of the present application. Referring to FIG. 5, in the second embodiment, the second detection device 242 is disposed at the outlet of the storage column 210. FIG. 6 is a schematic view of a bucket 220 of the vending machine 100 according to the second embodiment of the present application. In other examples, the second detection device 242 is further disposed at the inlet of the bucket 220. The second detection device 242 is electrically connected to the controller 230. When the gap between the item in the storage column 210 and the item in the bucket 220 is detected, the second detection device 242 may output a gap-detected signal. According to the gap-detected signal, the controller 230 controls the first conveying mechanism 211 to stop conveying the item. The second detection device 242 may be a photoelectric sensor. In one or more embodiments, in other examples, the second detection device 242 may also be other sensor equipment such as a distance sensor.

The present embodiment further provides an item dispensing method, which is applied in the vending machine 100. The method includes the following operations.

In the case where the item enter the bucket 220 from the storage column 210, the controller 230 controls the first conveying mechanism 211 in the storage column 210 to convey the item in the storage column 210 to the bucket 220 at a first preset speed and controls the second conveying mechanism 221 in the bucket 220 to convey the item received from the storage column 210 by the bucket 220 to the inside of the bucket 220 at a second preset speed, where the first preset speed is less than the second preset speed, that is, the second conveying mechanism 221 conveys the item having been located at the inlet of the bucket 220 to the inside of the bucket 220 at a speed greater than the speed of the first conveying mechanism 211 and the item having not reached the bucket 220 and still being in the storage column 210 moves in the storage column 210 at a speed less than the speed of the second conveying mechanism 221. As such, the item in the bucket 220 and the item in the storage column 210 are separated gradually and the gap between the item in the bucket 220 and the item in the storage column 210 is increased. The second detection device 242 can detect the gap between the item in the storage column 210 and the item in the bucket 220. When there is detected a gap between the item located in the storage column 210 and the item located in the bucket 220, the second detection device 242 controls the first conveying mechanism 211 to stop conveying the item.

In the vending machine 100 provided by the present embodiment, the item in the storage column 210 is conveyed to the bucket 220 by the first conveying mechanism 211; in the case where the item enter the bucket 220, the first conveying mechanism 211 in the storage column 210 conveys the item left in the storage column 210 at the first preset speed and the second conveying mechanism 221 in the bucket 220 conveys the item received from the storage column 210 by the bucket 220 to the inside of the bucket 220 at the second preset speed. Because the first preset speed is less than the second preset speed, the distance between the item in the bucket 220 and the item in the storage column 210 increases. When the second detection device 242 detects the gap between the item in the storage column 210 and the item in the bucket 220 and outputs a gap-detected signal, the controller 230 controls the first conveying mechanism 211 to stop conveying the item in the storage column 210 while the second conveying mechanism 221 may continue conveying the item in the bucket 220. Because the first conveying mechanism 211 is stopped under the control of the controller 230 after the second detection device 242 outputs the gap-detected signal, the situation where there are at least two items in the bucket 220 will not occur and the bucket 220 can dispense only one item at a single time.

Therefore, in the vending machine and item dispensing method provided by embodiments of the present application, a first conveying mechanism is disposed at the storage column and a second conveying mechanism is disposed at the bucket; as an item is entering the bucket, the first conveying mechanism is controlled to convey the item in the storage column to the bucket at a first preset speed and the second conveying mechanism is controlled to convey the item received from the storage column by the bucket to the inside of the bucket at a second preset speed greater than the first preset speed, where the first preset speed is less than the second preset speed. As such, as the item is being conveyed from the storage column to the bucket, after the previous item is beginning to enter the bucket, the distance between the previous item and the next item is increased because the previous item is moving to the inside of the bucket at the second preset speed greater than the first preset speed. This solves the problem that two items are conveyed into the bucket at a single time because the two items are closely attached to each other or the distance between the two items is too small, thereby preventing the loss of the goods supplier.

What is claimed is:

1. A vending machine, comprising:
a storage column, configured to store items;
a bucket, configured to receive an item from the storage column;
a first conveying mechanism, disposed at the storage column and configured to convey the item in the storage column to the bucket;
a second conveying mechanism, disposed at the bucket and configured to convey the item from the storage column to an inside of the bucket; and
a controller, electrically connected to the first conveying mechanism and to the second conveying mechanism;
wherein the controller is configured to, as the item is entering the bucket, control the first conveying mechanism to convey the item to the bucket at a first preset speed and control the second conveying mechanism to convey the item to the inside of the bucket at a second preset speed, the first preset speed being less than the second preset speed.

2. The vending machine of claim 1, wherein the first conveying mechanism and the second conveying mechanism are belt mechanisms.

3. The vending machine of claim 1, further comprising:
a second detection device, disposed at an outlet of the storage column or at an inlet of the bucket, electrically connected to the controller, and configured to output a gap-detected signal in response to a gap between an item located in the storage column and the item located in the bucket being detected;
wherein the controller is further configured to control the first conveying mechanism to stop conveying the item located in the storage column according to the gap-detected signal.

4. The vending machine of claim 1, wherein the first preset speed has a value of zero.

5. The vending machine of claim 1, further comprising:
a first detection device, disposed at the bucket and electrically connected to the controller and configured to output an item-beginning-to-enter signal as the item is beginning to enter the bucket;
wherein the controller is configured to control the first conveying mechanism to convey the item to the bucket at the first preset speed and control the second conveying mechanism to convey the item to the inside of the bucket at the second preset speed, according to the item-beginning-to-enter signal.

6. The vending machine of claim 5, wherein the first detection device is further configured to output an item-entrance-finished signal in response to the item having entered the bucket, and wherein the controller is further configured to control the second conveying mechanism to stop conveying the item according to the item-entrance-finished signal.

7. The vending machine of claim 5, wherein the first detection device is a photoelectric sensor, a pressure sensor, or a distance sensor.

8. The vending machine of claim 5, wherein the first preset speed has a value of zero.

9. The vending machine of claim 1, wherein the first conveying mechanism comprises a driving assembly and a pushing plate, wherein the driving assembly is configured to drive the pushing plate to move and the pushing plate is operative to push the item in the storage column to move toward the bucket.

10. The vending machine of claim 9, wherein the driving assembly comprises a motor, a rack, and a gear, wherein the rack extends along a lengthwise direction of the storage column, the motor is fixed to the pushing plate and is drivingly connected to the gear, and the gear is operative to be engaged with the rack.

11. An item dispensing method, applied to a vending machine, the vending machine comprising a storage column configured to store items and a bucket configured to receive an item from the storage column, wherein a first conveying mechanism is disposed at the storage column and is configured to convey the item in the storage column to the bucket, and a second conveying mechanism is disposed at the bucket and is configured to convey the item from the storage column to an inside of the bucket, the method comprising:
as the item is entering the bucket, controlling the first conveying mechanism to convey the item to the bucket at a first preset speed and controlling the second conveying mechanism to convey the item to the inside of the bucket at a second preset speed, the first preset speed being less than the second preset speed.

12. The item dispensing method of claim 11, further comprising:
   detecting the presence of a gap between an item located in the storage column and the item located in the bucket; and
   in response to a gap between the item located in the storage column and the item located in the bucket being detected, controlling the first conveying mechanism to stop conveying the item located in the storage column.

13. The item dispensing method of claim 11, wherein the first conveying mechanism and the second conveying mechanism are belt mechanisms.

14. The item dispensing method of claim 11, wherein the first preset speed has a value of zero.

15. The item dispensing method of claim 11, wherein the operation of as the item is entering the bucket, controlling the first conveying mechanism to convey the item to the bucket at a first preset speed and controlling the second conveying mechanism to convey the item to the inside of the bucket at a second preset speed comprises:
   detecting whether the item is beginning to enter the bucket; and
   in response to detecting that the item is beginning to enter the bucket, controlling the first conveying mechanism to convey the item to the bucket at the first preset speed and controlling the second conveying mechanism to convey the item to the inside of the bucket at the second preset speed.

16. The item dispensing method of claim 15, further comprising:
   detecting whether the item has entered the bucket; and
   in response to detecting that the item has entered the bucket, controlling the second conveying mechanism to stop conveying the item.

17. The item dispensing method of claim 15, wherein the first preset speed has a value of zero.

18. The item dispensing method of claim 11, wherein the first conveying mechanism comprises a driving assembly and a pushing plate, wherein the driving assembly is configured to drive the pushing plate to move and the pushing plate is operative to push the item in the storage column to move toward the bucket.

19. The item dispensing method of claim 18, wherein the driving assembly comprises a motor, a rack, and a gear, wherein the rack extends along a lengthwise direction of the storage column, the motor is fixed to the pushing plate and is drivingly connected to the gear, and the gear is operative to be engaged with the rack.

* * * * *